Sept. 11, 1962 A. E. BRENNEMANN ET AL 3,054,091

DATA TRANSFERRING SYSTEMS

Filed Dec. 24, 1956 4 Sheets-Sheet 1

*INVENTORS*
ANDREW E. BRENNEMANN
HERBERT K. WILD
WILLIAM WOLENSKY

*BY* John E. Dougherty Jr.
ATTORNEY

Sept. 11, 1962 A. E. BRENNEMANN ET AL 3,054,091

DATA TRANSFERRING SYSTEMS

Filed Dec. 24, 1956 4 Sheets-Sheet 2

Sept. 11, 1962 A. E. BRENNEMANN ET AL 3,054,091

DATA TRANSFERRING SYSTEMS

Filed Dec. 24, 1956 4 Sheets-Sheet 4

United States Patent Office 3,054,091
Patented Sept. 11, 1962

3,054,091

DATA TRANSFERRING SYSTEMS

Andrew E. Brennemann, Poughkeepsie, Herbert K. Wild, Wappingers Falls, and William Wolensky, Poughkeepsie, N.Y., assignors to International Business Machines Corporation, New York, N.Y., a corporation of New York Filed Dec. 24, 1956, Ser. No. 630,133
21 Claims. (Cl. 340—173.2)

The present invention relates to circuitry for transferring and transposing data between and within arithmetic and register units such as are found in computing and data handling equipment and is related more particularly to circuitry for transferring and transposing data in accordance with a new mode of operation and to circuitry of this type wherein elements having piezoelectric and/or ferroelectric properties are employed as switching and/or storage elements.

Information items are, in many computing systems, represented in the binary notation. It has become common in describing the operation of such systems to refer to the various information items in the following manner. Each binary digit, zero or one, is termed a bit of information. A prescribed number of such bits is termed a character and a number or group of characters is termed a word. For example, in the so called binary decimal system four binary orders of information are employed to store a decimal order of information. Thus, following the nomenclature set out above each of the four binary digits is termed a bit and the four binary digits which represent the single decimal order, are termed a single character. It is often necessary that an information item in the form of a character or a word stored in a register, which consists of a plurality of bistable device each storing one binary digit, be column shifted; that is, that the particular binary orders (bits) or decimal orders (characters) be shifted either to the left or right in the register or in the course of a transfer of the item from the register to another register or functional unit in the machine. Shifting of this nature, either within a single register or accompanying the transfer of the information item to another register or functional unit in the machine, is preferably a parallel operation. This is especially so when high speed is the paramount machine requirement. It is also preferable that the circuitry employed to accomplish the column shifting be capable of and selectively controllable to accomplish the shifting of bits or characters one or more columns or orders in a single operation.

A prime object of the present invention is to provide a device for controlling column shifting of informational data.

Another object is to provide a data transferring system operated in a novel mode in accordance with which each bit, in an information item to be transferred, is stored in each of a plurality storage elements in a control matrix.

These objects, as well as other objects hereafter set forth, are accomplished, as is shown in one of the embodiments of the invention herein disclosed, by employing, in a control matrix, a plurality of bistable storage devices in the form of ferroelectric capacitors arranged in a coordinate array. Each row of ferroelectric capacitors in the coordinate array consist, in the preferred embodiment disclosed, of a bar or crystal of barium titanate having mounted thereon at spaced intervals pairs of opposing electrodes. The storage properties of these capacitors, as well as the sonic properties which are employed to interrogate the capacitors, are discussed in the copending applications Serial No. 596,707 filed July 9, 1956, in behalf of A. E. Brennemann and Serial No. 621,348 filed Nov. 9, 1956, in behalf of A. E. Brennemann et al. Both of these applications are, by this reference thereto, incorporated as part of the subject application. When it is desired to transfer and column shift an information item stored in a register, which for the illustrative purposes of this disclosure is shown to comprise a plurality of bistable binary storage devices, each storage device of the register is interrogated coincidently causing signals indicative of the particular binary bits stored therein to be coincidently produced at the output terminals of the register. These terminals are coupled to the coordinate column drive lines of the barium titanate array. Each drive line is, in turn, connected to one electrode on each of the ferroelectric capacitors in a corresponding column of the array. As is usual in binary systems, the presence of a pulse is employed to represent one binary digit and the absence of a pulse is employed to represent the other binary digit. Here, by way of example, the presence of a pulse on an output terminal of the register, and thus on the column drive line to which it is coupled, is indicative of a binary one and the design is such that the pulses thus applied to these drive lines are of sufficient magnitude and proper polarity to switch each capacitor in the column from one of its stable states to the other. The information item originally stored in the register is thus stored completely in each row of the matrix. After the information item is thus stored in the control matrix, it may be read out by selectively pulsing one of a plurality of shift drive lines each of which is connected to the other electrodes of all the capacitors along one diagonal of the array. The pulsing of any one of these shift lines causes sonic waves to be propagated in the bars of barium titanate. These sonic waves cause output pulses to be developed between pairs of output electrodes mounted at the ends of the bars. The polarity of the output pulse developed between each pair of output electrodes is indicative of the binary digit stored in the ferroelectric capacitor in the corresponding row which is connected to the particular shift line pulsed. The output electrodes on the barium titanate bars may be connected to another machine device, for example, a second register, or if desired, to the register in which the information was originally stored and the extent of the column shift effected in the transfer is dependent only upon the particular one of the shift lines which is pulsed. The sonic interrogation of the barium titanate capacitors in the control matrix is nondestructive and thus pulses representing the digits comprising the character or word stored in this matrix may be repeatedly produced with the same or different column shifts at the output electrodes.

In accordance with a second embodiment of the invention the bits comprising the word or character read out of the storage register are not stored in the control matrix, the pulses applied to the column drive lines being of insufficient magnitude to switch the ferroelectric capacitors. Selective column shifting in transfer is accomplished by pulsing one of the shift lines coincidently with the application of the binary bit pulses to the column drive lines. Due to the linearity of the piezoelectric response of barium titanate, when operated along the saturation portion of its hysteresis loop, the ferroelectric capacitors are capable of performing as AND circuits and the magnitude of the outputs developed between each pair of output electrodes is indicative of whether or not there was a coincident application of pulses by a column drive line and the pulsed shift line to any capacitor in the corresponding row. The output may, as above, be fed to another register, the extent of the column shifting being dependent on which shift line is pulsed and, since there is a delay inherent in the sonic transmission in the barium titanate bars, the output may be fed back, in shifted form, into the original register in which it was stored.

Thus another object of the present invention is to provide a matrix for control of information transfer which employs elements having piezoelectric and/or ferroelectric properties as switching and/or storage elements.

A further object is to provide a control matrix capable of column shifting bits of information within a register one or more columns in a single parallel operation.

A feature of the invention lies in the provision of a control matrix wherein each information item is stored in a plurality of storage elements, each of which may be interrogated nondestructively and selectively by pulsing one of a plurality of shift lines associated with the matrix.

A further object is to provide a control matrix wherein each information item is stored in a plurality of storage elements and wherein pulses representing the bits forming the information item may be produced at the output of the matrix in any desired columnar order by selectively pulsing one of a plurality of shift drive lines associated with the matrix.

Other objects of the invention will be pointed out in the following description and claims and illustrated in the accompanying drawings, which disclose, by way of example, the principle of the invention and the best mode, which has been contemplated, of applying the principle.

Figure 1:
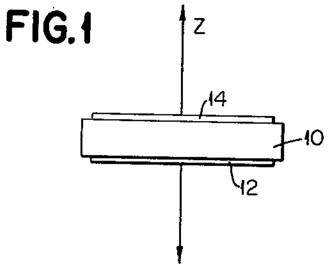
FIG. 1 is a diagrammatic representation of an electroded crystal of barium titanate.

Referring now to FIG. 1, there is shown a bar of crystalline barium titanate 10, which has connected to its opposite faces electrodes 12 and 14. The crystal 10 and the electrodes 12 and 14 form a capacitor which, since the crystal has ferroelectric properties, is capable of being caused to assume two stable states of remanent polarization in opposite directions. These states are represented at *a* and *b* on the hysteresis loop of FIG. 3 and the crystal, when in stable state *a*, may be caused to assume the opposite stable state by applying to the capacitor a voltage in excess of the coercive voltage $+V_c$ in FIG. 3. The application of a voltage of opposite polarity and greater than the coercive voltage $-V_c$ will cause the capacitor to reassume the stable state *a*. Applications to the capacitor, for limited times, of voltages less than the coercive voltage cause only substantially reversible excursions along the essentially flat portions of the hysteresis loop. Applications of voltages of a polarity to increase the polarization in the original remanent direction similarly cause reversible excursions along the upper or lower portions of the hysteresis loop and upon termination of such pulses, the capacitor assumes its initial remanent condition at *a* or *b* as the case may be.

Figure 2:
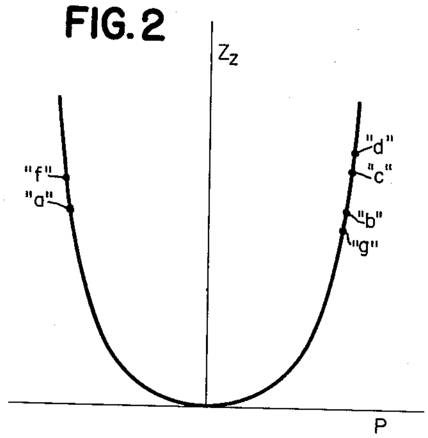
FIG. 2 is a diagrammatic representation of the relationship between strain and polarization for a crystal of barium titanate.
Figure 3:
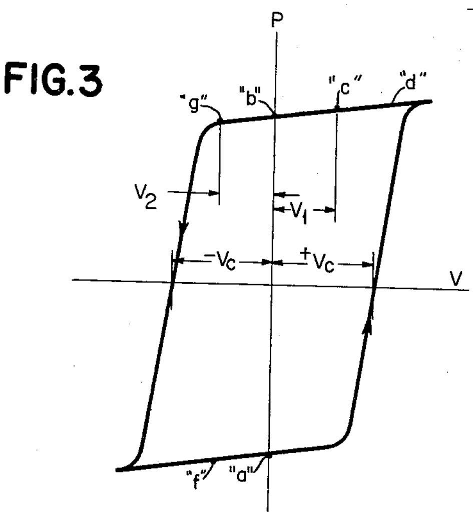
FIG. 3 shows a hysteresis loop obtained by plotting polarization versus applied voltage for an electroded crystal of barium titanate.

Though the overall relationship between polarization and strain in a ferroelectric is, as indicated in FIG. 2, electrostrictive and thus follows a square law, the relationship is essentially linear and therefore classifiable as piezoelectric when the polarization changes effected are along the substantially flat upper and lower portions of the hysteresis loop of FIG. 3. These relationships are discussed in greater detail in the above-mentioned copending applications and, as there pointed out, the linearity of the strain polarization relationship in this operating region is due to the fact that the initial spontaneous polarization, represented at *a* and *b* in FIGS. 2 and 3 is exceedingly large in comparision to the polarization changes effected by the application of the electric fields. Thus, for example, if with the material initially in the remanent state *b*, a positive pulse, in magnitude equal to $V_1$ shown in FIG. 3, is applied to the capacitor, the polarization-voltage relationship is depicted by the segment *bc* of the curve of FIG. 3 and the polarization-strain relationship by the similarly designated segment of the curve of FIG. 2. Where a voltage of twice this magnitude is applied the same relationships are depicted in FIGS. 2 and 3 by the segments *bd*. It should be noted that the magnitude of the polarization changes shown in FIG. 2 relative to the initial remanent condition of the barium titanate are, for the purpose of illustration, greatly exaggerated. Due to the linearity of the relationship between polarization and strain, that is, the "piezoelectric" character of the barium titanate, when operated along the flat portion of its hysteresis loop, the dimensional change in the material as the segment *bd* of FIG. 3 is traversed is, as shown, twice the dimensional change effected as the segment *bc* is traversed.

Figure 4:
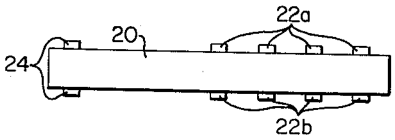
FIGS. 4 and 5 are diagrammatic showings of multi-electrode barium titanate elements such as are usable in practicing the present invention.
Figure 6:
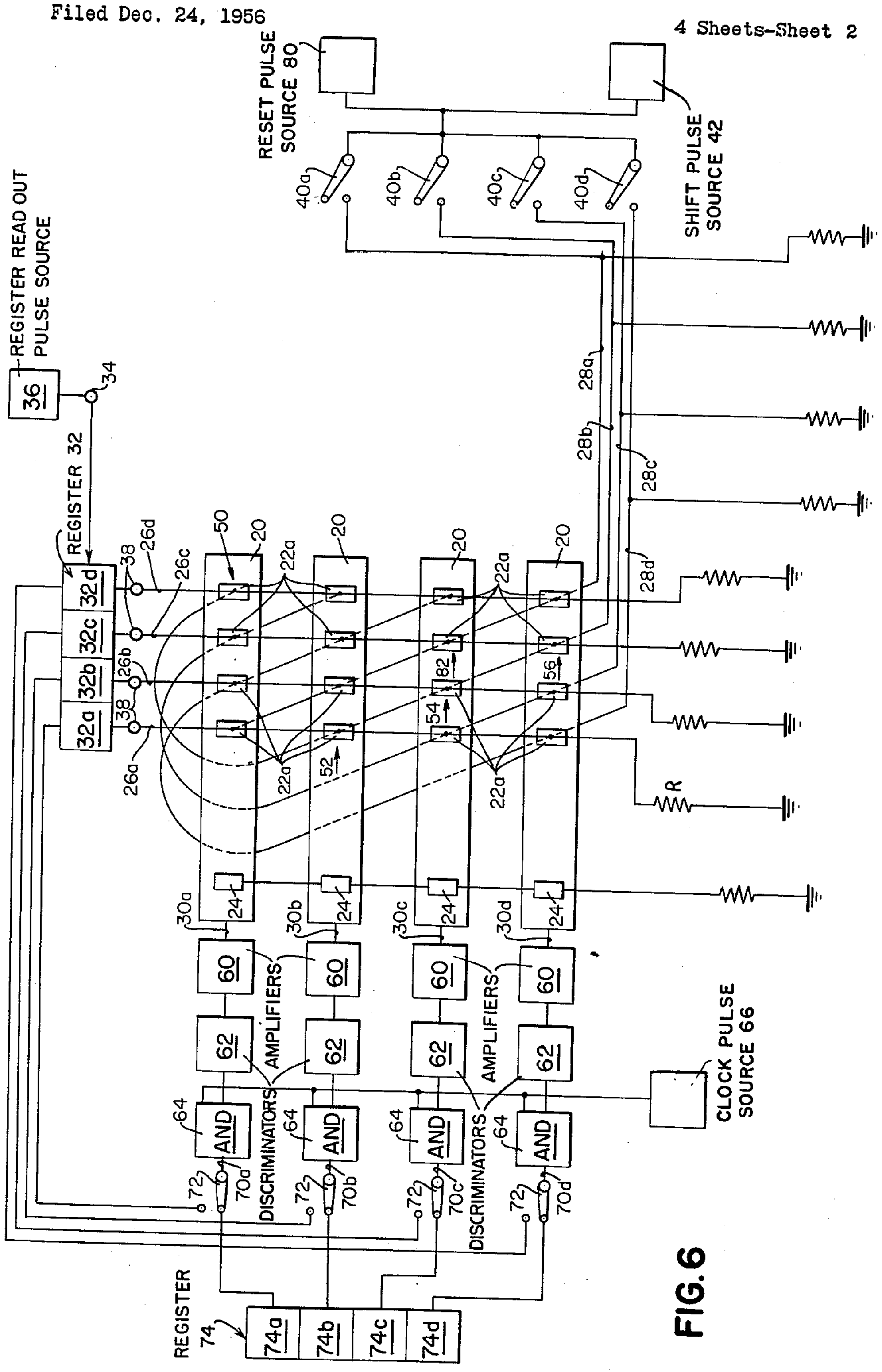
FIG. 6 is a diagrammatic representation of circuitry operable in accordance with the principles of the present invention.

Referring now to FIG. 6, there is shown diagrammatically a circuit employing four barium titanate bars 20 in a control matrix operable in accordance with the principles of the invention. Each of these bars has mounted thereon, as shown in FIG. 4, four pairs of input electrodes 22*a*, 22*b* and one pair of output electrodes 24. Each pair of electrodes together with the barium titanate therebetween forms a ferroelectric capacitor. Input information is supplied to the matrix by four column drive lines 26*a*, 26*b*, 26*c* and 26*d* each of which is connected to the upper electrode 22*a* of each of the ferroelectric capacitors in one vertical row of the matrix. The lower electrodes of each of the input electrodes are connected to diagonally arranged shift lines 28*a*, 28*b*, 28*c* and 28*d*. The outputs of the matrix are developed between the pairs of output electrodes 24 and appear on output lines 30*a*, 30*b*, 30*c* and 30*d*, each of which is connected to the upper of the pairs of output electrodes on one of the bars 20.

The input lines to the matrix are connected to receive pulses read out of a register 32 shown in box form. Only a four position register and a four by four control matrix are shown in illustrating the invention, it being understood that the register and matrix might be extended to as large a capacity as any particular application requires. The register 32 comprises four bistable storage devices 32*a*, 32*b*, 32*c* and 32*d* for storing the first, second, third and fourth order bits of a binary or binary decimal character. The construction of registers of this nature is well established in the art as is their ability, when pulsed by a readout pulse such as might be applied to terminal 34 by a readout pulse source 36, to coincidently develop at their output terminals pulses indicative of the particular bits stored in each order of the register. For the purposes of this disclosure it is assumed that where a binary one is stored in a particular order, a pulse applied to terminal 34 causes a positive pulse to be developed at the output terminal 38 in that order and where a binary zero is stored in a particular order of the register, a readout pulse applied at terminal 34 is ineffective to cause any output to be developed at the output terminal 38 for that particular order.

Each of the input and output ferroelectric capacitors in the matrix is initially in a remanent state of polarization in the same direction, which state is represented at *a* in FIG. 3. The pulses supplied at each output terminal 38, when binary ones are read out of the corresponding order of register 32, are of sufficient magnitude to cause each of the ferroelectric capacitors in the column coupled to the particular output terminal to be subjected to a voltage greater than the coercive voltage $V_c$ for the capacitors. For example, if initially the character stored in register 32 is "0110" and a readout pulse is applied to terminal 34, the potential on the drive lines 26*b* and 26*c* is raised sufficiently to cause each of the capacitors in the second and third vertical rows to be switched from the remanent condition *a* to remanent condition *b*. Since binary zeros were stored in the first and fourth orders 32*a* and 32*d* of the register, the potential of drive lines 26*a* and 26*d* remains unchanged and the capacitors in the first and fourth columns in the matrix remain in the remanent condition *a*. By this operation the entire character originally stored in register 32 is stored in each of the rows of the control matrix, each bit of character being stored in one capacitor in each row. The circuit by which the capacitors are switched may be traced, for example, from the output terminal 38 for the second order of the register 32 through column drive line 26*b*, the upper capacitor in the first row, column shift line 28*d* and the resistance R coupling this line to ground.

After the bits of character to be transferred are thus entered into each of four positions in the control matrix, the matrix may be interrogated selectively under control of four switches 40*a*, 40*b*, 40*c* and 40*d*. Each of these switches, when closed, connects a shift pulse source 42 to one of the column shift lines. Though, for illustrative purposes, the switches are shown diagrammatically as mechanical switches, it is, of course, understood that other types of electrical and electronic switches might be substituted. Switch 40*a*, when closed, causes a shift pulse to be applied to shift line 28*a*, which line is termed the zero shift line in that when pulsed it causes the character in the control matrix to be read out in the same form as entered. The output line 30*a* may be termed the first order output channel and lines 30*b*, 30*c* and 30*d* the second, third and fourth order output channels for the matrix. The outputs, expressed as binary digits, which are developed when the different switches are closed after a character "0110" has been entered in the matrix are shown in the following table:

| | line 30*a* | line 30*b* | line 30*c* | line 30*d* |
|---|---|---|---|---|
| Switch 40*a* (shift zero) | 0 | 1 | 1 | 0 |
| Switch 40*b* (shift one) | 0 | 0 | 1 | 1 |
| Switch 40*c* (shift two) | 1 | 0 | 0 | 1 |
| Switch 40*d* (shift three) | 1 | 1 | 0 | 0 |

As indicated in this table the column shifting accomplished is to the right and though in many applications it is the practice to spill over bits when shifted out of the last order position, the arrangement of diagonal shift lines shown here is such that the shifting is circular. This is exemplified by the results of the shifting of three columns wherein as shown above the binary one digits, originally in the second and third orders, are, by this shift to the right, transferred as the first and second orders of the character.

Figure 7:
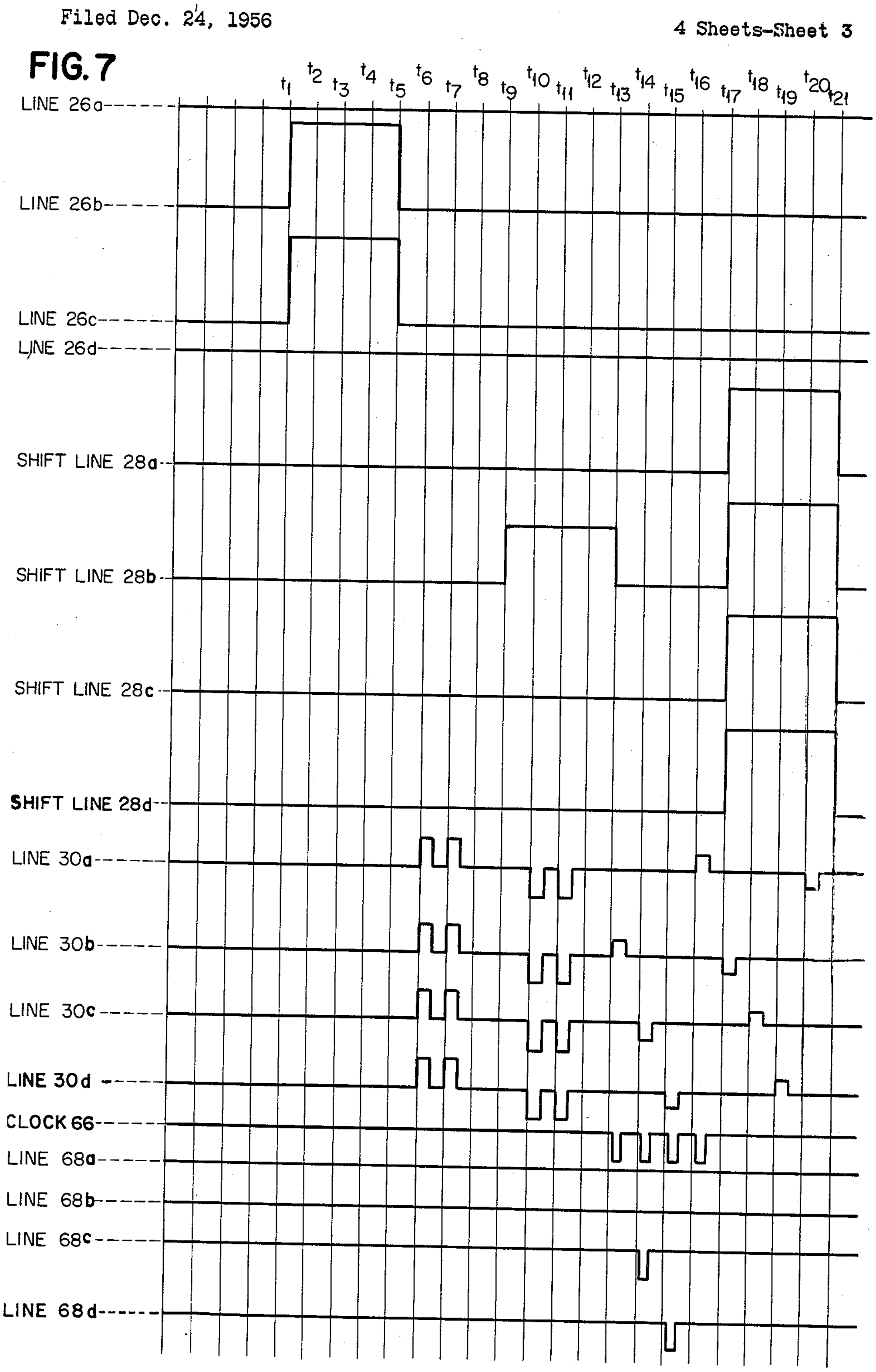
FIG. 7 is an electrical timing diagram for the circuit of FIG. 6 when operated in accordance with a first mode of operation.

The manner in which the outputs are developed for a column shift of two of the character "0110" is here described by way of illustration, with particular reference to the electrical timing diagram of FIG. 7. The cycle depicted in this figure is a write, read and reset cycle. At time $t_1$, a pulse is applied to terminal 34 causing positive pulses to appear on lines 26*b* and 26*c* and no pulses to appear on lines 26*a* and 26*b*. The character stored in register 32 is thus read into each of the rows of the control matrix. Since both the application and termination of these pulses cause polarization changes in each of the capacitors in the second and third columns, the barium titanate dielectrics of these capacitors are strained causing sonic waves to be transmitted down each of the bars 20. These waves cause pulses to be developed between each of the pairs of output terminals. These pulses are shown to occur at times $t6$ and $t7$ in FIG. 7 on the lines 30*a*, 30*b*,

30*c* and 30*d* but at this time gating circuitry later to be described prevents the transfer of these pulses to other units. Reference should be made to the aforementioned copending application Serial No. 596,407 for a complete explanation of the polarity of the output pulses developed due to sonic waves propagated in a bar of barium titanate when subjected to a pulse which is of proper polarity to switch the direction of polarization and in magnitude much greater than the coercive voltage for the crystal. After the write portion of the cycle, all the capacitors in the first and fourth columns are in the binary zero state represented at *a* of FIGS. 2 and 3 and the capacitors in the second and third columns of the matrix are in the binary one state represented at *b* in these figures.

The readout portion of the cycle is initiated at time $t_9$ when switch 40*b* is operated to allow pulse generator 42 to apply a positive pulse to shift line 28*b*. The magnitude of this pulse is such that the capacitors, the bottom electrodes 22 of which are connected to line 28*b*, are subjected to a voltage less than the coercive voltage for the material. The magnitude of the voltage to which these capacitors are subjected might, for example, be in the order of that shown at $V_2$ in FIG. 3. There are four capictors, one in each column, which have their bottom electrodes 22*b* connected to line 28*b*. These capacitors are the fourth capacitor 50 from the left in the top row, the first capacitor 52 in the second row, the second capacitor 54 in the third row and the third capacitor 56 in the fourth row. Due to the write operation, capacitors 54 and 56 being in the second and third columns, respectively, are in the binary one state at *b* of FIGS. 2 and 3 and the application by shift line 28*b* of the positive pulse, in magnitude $V_2$ volts, to the lower electrodes 22*b* of these capacitors causes the barium titanate forming the dielectric thereof to be strained. The relationship between the applied voltage and polarization and that between polarization and strain are depicted in FIGS. 2 and 3, respectively, by the segments *bg*. This strain represents a compression of the barium titanate causing a "compression type" sonic wave to be transmitted down the bars 20 which form the third and fourth rows of the matrix. These waves, after a time delay commensurate with the length and sonic propagation characteristics of the bar, cause outputs to be developed between the output capacitors for these rows. These outputs appear on output lines 30*c* and 30*d*. The output pulses developed on lines 30*c* and 30*d* occur at times $t_{14}$ and $t_{15}$, respectively, the pulse on line 30*d* being delayed longer since the distance between capacitor 56 and the output electrodes 24 of the fourth bar is greater than that between capacitor 54 and the output electrodes on the third bar. The pulses developed on these lines at this time are negative and are produced by the sonic disturbance effected by the leading edge of the shift pulse applied to line 28*b*. Pulses of opposite polarity are produced on lines 30*c* and 30*d* at time $t_{18}$ and $t_{19}$, respectively as a result of the sonic pulses propagated when the shift pulse is terminated.

The barium titanate dielectrics of capacitors 50 and 52 are also strained when the positive shift pulse is applied to line 28*b*, but since these capacitors are initially in the remanent condition *a* of FIG. 3, the positive shift pulse causes an increase in polarization and thus an expansion of the barium titanate as is depicted by the segments *af* of the curves of FIGS. 2 and 3. This expansion causes an "expansion type" wave to be propagated in the bars 20 which form the first and second rows of the matrix, which waves cause positive output pulses to be developed between the associated output electrodes 24. The output pulses are developed and applied to lines 30*a* and 30*b* at times $t_{16}$ and $t_{13}$, respectively. The trailing edge of the shift pulse causes pulses of opposite polarity to be developed and applied to lines 30*a* and 30*b* at time $t_{20}$ and $t_{17}$, respectively.

The output pulses developed on lines 30*a*, 30*b*, 30*c* and 30*d* are amplified by amplifier circuits shown in box form and designated 60 and are thence applied to discriminator circuits 62, also shown in box form. The function of the discriminator circuits is to pass only the negative binary one representing pulses and to reject the positive binary zero representing pulses. The outputs of each of the discriminator circuits are applied as one input to one of four AND circuits 64, the other input of each AND circuit being supplied by a clock pulse source 66.

As is shown in FIG. 7, clock pulse source 66 supplies four successive discrete clock pulses at time $t_{13}$, $t_{14}$, $t_{15}$ and $t_{16}$. It is at these times that the output pulses produced by the sonic waves generated in response to the leading edge of the shift pulse are applied to the other inputs of the AND circuits 64. The output of the system thus far described is gated during these time intervals and, since the gating is accomplished by discrete pulses timed to coincide with the actual output pulses, spurious noise signals which might precede or follow the output pulses are eliminated. Parenthetically it should be here noted that spurious signals due to sonic reflections may to a large degree be eliminated by utilizing single crystal barium titanate having edges which are tapered and have many inclusions. The outputs of the AND circuits 64 are applied to lines 70*a*, 70*b*, 70*c* and 70*d* which are in turn connected through switches 72, in the position shown, as inputs to a register 74. The first, second, third and fourth order positions of this register are designated 74*a*, 74*b*, 74*c* and 74*d*. In accordance with the table above, the pulsing of shift line 28*b* causes input pulses to be applied, as shown in FIG. 7, through lines 70*c* and 70*d* to the third and fourth order units of register 74. The transposed character is thus entered in this register as "0011." If desired, the switches 72 might be transferred and the character reinserted in register 32.

The illustrative timing diagram of FIG. 7 represents, as above mentioned, a single write, read and reset cycle wherein after the matrix is interrogated by pulsing the column one shift line 28*b*, switches 40*a*, 40*b*, 40*c* and 40*d* are coincidently closed at time $t_{17}$. Pulses, in magnitude greater than the coercive voltage $V_c$, are then supplied by a pulse source 80 to each of the shift lines to thereby reset all the capacitors in the matrix to remanent condition *a* anticipatory of the entry of another character into the matrix. However, the interrogation of the ferroelectric capacitors in the control matrix is nondestructive, the capacitors returning to their original remanent conditions after the termination of the applied shift pulse which pulse is in magnitude less than the coercive voltage for the barium titanate dielectric of the capacitors. Thus, the control matrix need not be reset after each read operation but may be repeatedly interrogated under control of switches 40*a*, 40*b*, 40*c* and 40*d* to successively produce output pulses representing the character with any desired column shifts. This feature is especially useful in multiplication operations wherein it is often necessary to successively shift the bits in a character or word as multiplication by each order of the multiplier is completed.

Figure 5:
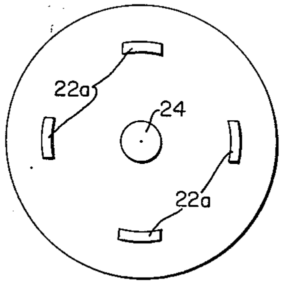

FIG. 5 shows a different arrangement of input electrodes 22*a* on a body of barium titanate such as might be employed instead of the bars 20 shown in FIGS. 4 and 6. The input electrodes 22*a* are on this crystal mounted sonically equidistant from the centrally located output electrode so that all the outputs of the matrix are produced at the same time, instead of sequentially as is the case with the bars 20.

Figure 8:
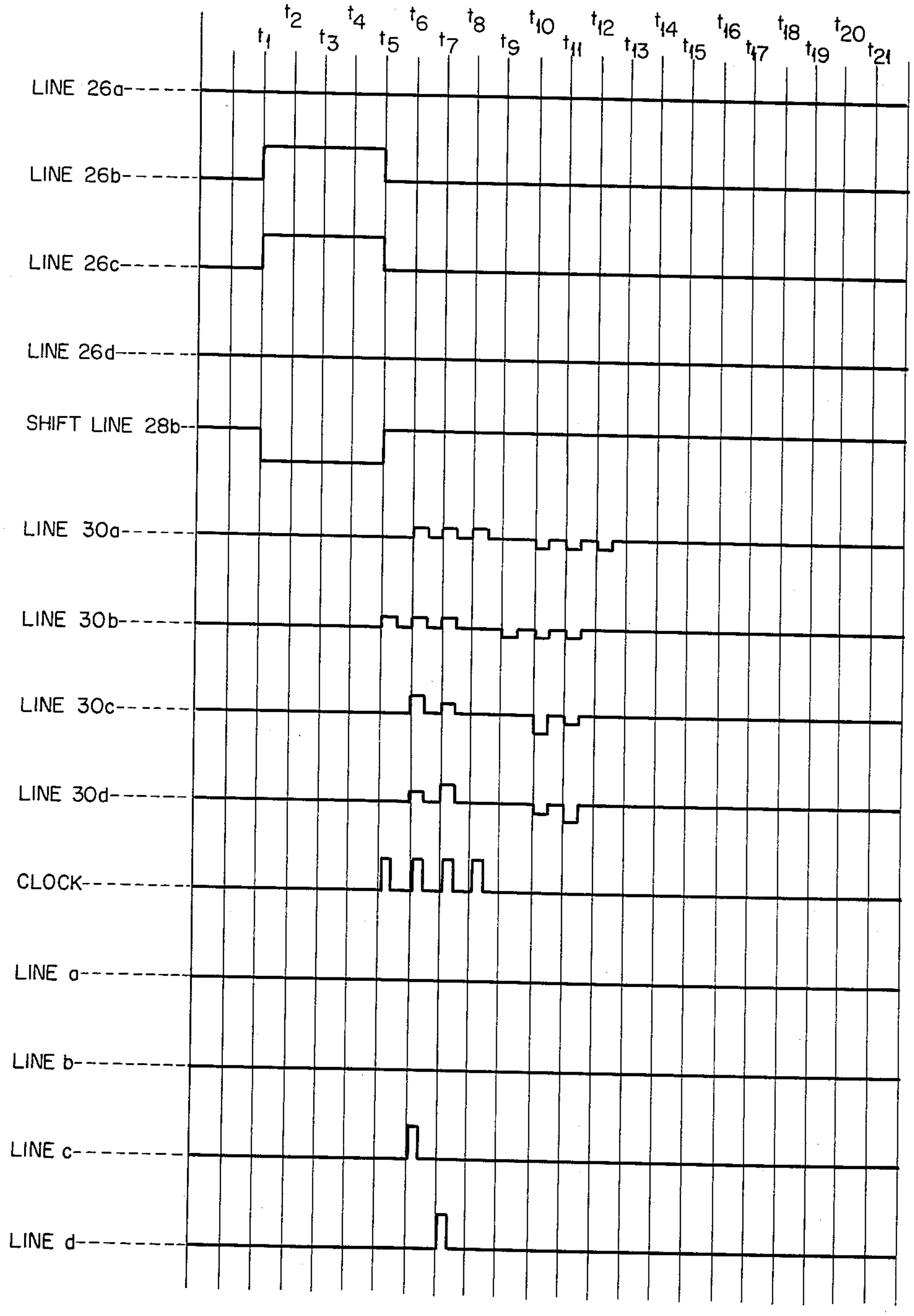
FIG. 8 is an electrical timing diagram for the circuit of FIG. 6 when operated in accordance with a second mode of operation.

The circuit diagram of FIG. 6 may also be utilized to illustrate the manner in which the control matrix may be operated without storing the information bits therein. When operated in this manner, the construction of the circuitry of register 32 is such that, when a readout pulse is applied at terminal 34, the positive binary one representing output pulses are of insufficient magnitude to switch the ferroelectric capacitors in the columns to which they are applied. However, it should be noted that, where each of the pulses applied is of a polarity to increase the initial polarization, larger pulses may be employed. The shifting of the bits in the character is again under the control of switches 40*a*, 40*b*, 40*c* and 40*d*. However, in this mode of operation the selected switch is closed to apply a pulse to the associated shift drive line at the same time as the write pulses are applied to the column drive lines by register 32. FIG. 8 is a timing diagram for this type of operation which illustrates the operation of the circuit when a character "0110" is read out of register 32 and column shift line 28*b* is coincidently pulsed. As shown in this figure, the pulse here supplied by the pulse source 42 to shift line 28*b* is negative and it, like the pulses applied to the column drive lines is appreciably less than the coercive voltage for the capacitors in the matrix. Assume that initially each of the capacitors in the matrix is in the remanent condition shown at *b* in FIG. 3. The negative pulse applied to the lower electrodes 22*b* of each of the capacitors connected to shift line 28*b* produces a polarization change in the same direction as that produced by the capacitors having their upper electrodes 22*a* connected to the positively pulsed column drive lines 26*b* and 26*c*. Each of the capacitors in the second and third columns and each of the capacitors connected to shift line 28*b* are subjected to at least one of these voltage pulses, but only the capacitors 54 and 56 which are located at the intersections of line 28*b* with lines 26*b* and 26*c*, are subjected to both pulses coincidently. Because of the linearity of the relationship between strain and polarization the dimensional changes produced in capacitors 54 and 56 are essentially twice that produced on the other capacitors connected to lines 26*b*, 26*c* and 28*b*. As a result, the sonic waves propagated in the associated bars 20 as the result of the straining of the barium titanate dielectric of these capacitors produce, between the output electrodes 24 on the same bar, outputs having essentially twice the magnitude as those produced in response to the sonic waves generated as the result of the application of only one of the pulses to other capacitors in the matrix.

These pulses are illustrated in FIG. 8. The first pulse, for example, developed between the output electrodes 24 of the third bar 20 and applied at time $t_6$ to line 30*c* is produced in response to the sonic wave generated by the coincident application of pulses by lines 26*b* and 28*b* to the upper and lower electrodes of capacitor 54. The output pulse produced on this line during the next time interval results from the application of the single pulse by line 26*c* to the third capacitor in the third row which capacitor is designated 82. The ratio of the magnitude of these pulses is, as indicated, essentially two to one, the larger pulse being representative of a binary one and the smaller pulse being representative of a binary zero. Similar pulses are developed and applied to the other output lines, the large pulse applied to line 30*d* at time $t_7$ resulting from the coincident application of pulses by lines 26*c* and 28*b* to capacitor 56. The output pulses are, as before, amplified by amplifiers 60 and discriminated by discriminator circuit 62. The design of the discriminators 62 for this mode of operation must be such as to pass only the larger binary one pulses and to reject the smaller binary zero pulses. The binary one pulses are then fed as one input to AND circuits 64, the other input being supplied in this application in the form of positive pulses by clock pulse source 66. The outputs of the AND circuits may be fed under control of switches 72, to either register 74 to enter the character in shifted form in this register, or back to the register 32 in which the character was originally stored. This latter type of operation is made possible, even when the character is not stored in the control matrix, by the delay necessarily incurred in the transmission of the binary zero and binary one representing sonic waves down the bars 20 of barium titanate. During this delay time, the bits of information are actually stored in the bars. It is this delay type storage which here allows a character, stored in register 32, to be shifted within the register in a single operation in parallel fashion a number of columns or orders limited only by the size of the control matrix.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In an information processing system, a coordinate matrix of ferroelectric capacitors arranged in columns and rows, each of said capacitors comprising first and second electrodes connected opposite each other on different faces of a body of ferroelectric material and the electrodes for the capacitors in each row in said matrix being connected on the same body of ferroelectric material, a plurality of column drive lines each connected to said first electrode of each of the capacitors in a corresponding column in said matrix, means for simultaneously applying to said column drive lines signals representative of binary digits in particular binary orders of an information character, a plurality of pairs of output electrodes, there being one pair of output electrodes connected on each of said bodies of ferroelectric material for producing outputs in response to sonic waves propagated in that body; and means for causing sonic waves representative of binary digits in particular orders of said information character to be propagated in selected ones of said ferroelectric bodies comprising a plurality of shift drive lines each connected to said second electrode for a plurality of said capacitors and each connected to said second electrode for only one capacitor in any one row and to said second electrode for only one capacitor in any one column in said matrix, and means coupled to said shift drive lines for selectively applying a signal to any one of said shift drive lines.

2. In an information processing system, a plurality of bars of ferroelectric material, first and second electrodes connected opposite each other on each of said bars of ferroelectric material, third and fourth electrodes connected opposite each other on each of bars of ferroelectric material, a plurality of output channel lines each connected to at least one of said third and fourth electrodes on a corresponding one of said bars of ferroelectric material for manifesting an output when a sonic wave is propagated between said third and fourth electrodes on said bar; a register storing an information item; and means for causing an output indicative of said information item stored in said register to be manifested on any one of said channels comprising a drive line connected to said first electrode on each of said bodies, said drive lines being connected to said register, means for interrogating said register to cause an output representative of the information item stored therein to be applied to said connected lines, a plurality of shift drive lines each connected to one of said first and second electrodes on each of said bars of ferroelectric material, and means coupled to said shift lines selectively operable to apply a shift pulse to any one of said shift lines.

3. In an information processing system, a coordinate matrix of ferroelectric capacitors arranged in columns and rows, each of said capacitors comprising first and second electrodes connected opposite each other on different faces of a body of ferroelectric material and the electrodes for the capacitors in each of said rows in said matrix being connected on the same body of ferroelectric material, a plurality of column input drive lines each connected to said first electrode of each of the capacitors in a corresponding column in said matrix, a plurality of shift drive lines each connected to said second electrode of each of a plurality of capacitors in said matrix and connected to said second electrode of only one capacitor in any one column and to said second electrode of only one capacitor in any one row of said matrix, means coupled to said column drive lines for simultaneously applying a number of information representing pulses thereto, each said information representing pulse being applied to one of said column input drive lines, controllable means coupled to said shift drive lines for selectively applying shift pulses thereto, and a plurality of pairs of output electrodes, there being one pair of output electrodes on each of said bodies of ferroelectric material for producing outputs in response to sonic waves propagated in that body.

4. In an information processing system, a plurality of bistable devices arranged in coordinate columns and rows, each of said storage devices being capable of being caused to assume a first stable condition representative of a binary digit one and a second stable condition representative of a binary digit zero, a plurality of input drive lines each associated with a corresponding one of said columns in said matrix and each connected to the storage devices in the column with which it is associated, means for applying to certain of said drive lines signals representative of a particular one of said binary digits, said signals being effective to cause each of the storage devices connected to said certain drive lines to assume the one of said remanent conditions which is representative of said particular digit, a plurality of output channel lines each associated with a particular one of said rows in said matrix for manifesting outputs indicative of the binary representing condition of any one of the storage devices in the associated row when that storage device is interrogated, a plurality of shift control lines each connected to each of a plurality of said storage devices, the plurality of storage devices to which any one shift line is connected including only one storage device in any one row and only one storage device in any one column of said matrix; and means controllable, after said signals have been applied to said certain input drive lines, to apply to a selected one of said shift lines a signal effective to interrogate each of the storage devices to which the selected shift line is connected.

5. In an information processing system, a matrix of storage devices arranged in coordinate columns and rows, each of said storage devices being capable of being caused to assume first and second stable states representative of binary information digits, each of said devices being initially in said first stable state, a plurality of input drive lines each connected to all of the storage devices in a corresponding column of said array, each of said drive lines being effective when pulsed to cause each of the storage devices to which it is connected to assume said second stable state, means coupled to said drive lines for selectively applying pulses thereto to thereby store an information character comprising a plurality of binary digits in said matrix with each binary digit being stored in one storage element in each row of the matrix, a plurality of interrogation lines each connected to a plurality of said storage devices, the plurality of storage devices to which any one interrogation line is connected including only one storage device in any one row and one storage device in any one column of said matrix, a plurality of output lines each coupled to the storage devices in a corresponding one of said rows in said matrix, and means for applying a signal to a particular one of said interrogation lines to thereby interrogate the state of each of the storage devices connected to that line and cause to be manifested on each output line which is coupled to one of the storage devices interrogated a pulse indicative of the state of that storage device.

6. In an information processing system, first, second, third and fourth storage devices, each capable of being caused to assume a plurality of information representing states, a first input line connected to said first and second storage devices, a second input line connected to said third and fourth storage devices, means coupled to said first input line for applying thereto a signal effective to cause each of said first and second storage devices to assume a particular one of said information representing states, means coupled to said second input line for applying thereto a signal effective to cause each of said third and fourth storage devices to assume a particular one of said information representing states, first output means coupled to said first storage device for producing an output indicative of the information representing state of said first storage device when an interrogation signal is applied to said first storage device, second output means coupled to said second storage device for producing an output indicative of the information representing state of said second storage device when an interrogation signal is applied to said second storage device and also coupled to said third storage device for producing an output indicative of the information state of third device when an interrogation signal is applied to said third storage device, third output means coupled to said fourth storage device for producing an output indicative of the information representing state of said fourth storage device when an interrogation signal is applied to said fourth storage device, first interrogation means coupled to said first and third storage devices and effective when operated to apply an interrogation signal to each of said first and third storage devices and second interrogation means coupled to said second and fourth storage devices and effective when operated to apply an interrogation signal to each of said second and fourth storage devices.

7. The invention as claimed in claim 6 wherein each of said storage devices comprises a ferroelectric capacitor.

8. The invention as claimed in claim 7 wherein the dielectric of each of said capacitors comprises barium titanate.

9. The invention as claimed in claim 6 wherein said first storage device comprises a first pair of electrodes connected opposite each other on a first body of ferroelectric material, and said second and third storage devices respectively comprise second and third pairs of electrodes connected opposite each other on a second body of ferroelectric material.

10. In an information processing system, a matrix of ferroelectric capacitors arranged in coordinate columns and rows and each capable of being caused to assume first and second remanent information representing conditions, each of said capacitors comprising a pair of input electrodes connected to a body of ferroelectric material and each of said capacitors in any one row of said matrix being connected to the same body of ferroelectric material, a plurality of pairs of output electrodes, there being one pair of output electrodes for each row in said matrix connected to the same body of ferroelectric material as the capacitors in that row, a plurality of input drive lines for simultaneously applying to said capacitors in said matrix a plurality of pulses each representative of a binary order of an information character, each of said input drive lines being connected to all of the capacitors in a corresponding column of said matrix and each of said pulses being applied to a corresponding one of said input lines, and a plurality of shift drive lines for controlling the transfer of information characters through said matrix, each of said shift lines being connected to a plurality of capacitors in said matrix and connected to only one capacitor in any one row and one capacitor in any one column in said matrix.

11. In an information processing system, a matrix of ferroelectric capacitors arranged in coordinate columns and rows and each capable of being caused to assume first and second remanent information representing conditions, each of said capacitors comprising a pair of input electrodes connected to a body of ferroelectric material and each of said capacitors in any one row of said matrix being connected to the same body of ferroelectric material, a plurality of input drive lines each connected to the capacitors in a corresponding column of said matrix, means for applying pulses representative of binary orders of an information character to said input drive lines, a plurality of shift drive lines each connected to a plurality of said capacitors and each connected to only one capacitor in any one row of said matrix and only one capacitor in any one column of said matrix, means controllable to apply a pulse to any selected one of said shift lines coincidently with the application of said pulses to said input drive lines to thereby cause sonic waves representative of the binary orders of said character to be propagated in selected ones of said bodies of ferroelectric material, and a plurality of pairs of output electrodes, each pair of output electrodes being connected to a corresponding one of said bodies of ferroelectric material for producing outputs in response to sonic waves propagated therein.

12. The invention as claimed in claim 11 wherein the pulses applied to said input drive lines and the pulses applied to a selected shift line are each effective to cause a polarization change in the same direction in the capacitors connected to the pulsed lines.

13. The invention as claimed in claim 12 wherein the magnitude of said pulses applied to said shift and input lines is such that the application of a pulse to one of said input lines coincidently with the application of a pulse to a selected one of said shift lines is ineffective to switch the remanent state of a capacitor to which both of said lines are connected.

14. In an information processing system, a matrix of ferroelectric capacitors arranged in coordinate columns and rows and each capable of being caused to assume first and second remanent information representing conditions, each of said capacitors comprising a pair of input electrodes connected to a body of ferroelectric material and each of said capacitors in any one row of said matrix being connected to the same body of ferroelectric material, each of said capacitors being capable of assuming first and second remanent information representing states and each normally in said first state, a plurality of input drive lines each connected to all the capacitors in a corresponding column of said matrix, means for applying pulses representative of binary orders of an information character to said drive lines to thereby cause each of said capacitors in a column connected to a pulsed input drive line to assume said second remanent state, a plurality of shift lines each connected to a plurality of said capacitors and each connected to only one capacitor in any one row and only one capacitor in any one column of said control matrix, means controllable after said pulses have been applied to said input drive lines to apply a pulse to any selected one of said shift lines, said pulse applied to the selected shift line being of insufficient magnitude to be effective to reverse the remanent state of any of the capacitors connected to the selected shift line but being effective to cause to be propagated in each of said row ferroelectric bodies sonic waves representative of the remanent state of any capacitor in that row which is connected to the selected shift line, and a plurality of pairs of output electrodes, each pair of output electrodes being connected to a corresponding one of said ferroelectric bodies for producing outputs in response to sonic waves propagated therein.

15. A data handling system comprising a coordinate array of bistable storage elements each adapted to assume a stable state representative of binary information, a plurality of information input lines arranged along one coordinate direction of said array with each coupled to a group of storage elements in the corresponding direction, a plurality of output lines arranged along the other coordinate direction with each coupled to a group of storage elements in the corresponding direction, a plurality of drive lines each coupled to a plurality of said storage elements each of which is associated with a different one of said output lines and a different one of said input lines, means for selectively energizing said input lines and causing storage elements associated therewith to assume an information representing state, and means for selectively energizing said drive lines after said storage elements have been caused to assume said information representing states cause storage elements associated therewith and in an information state to cause an output signal to be developed on the output lines associated therewith.

16. In an information processing system, a matrix of bistable storage elements, a plurality of input drive lines each connected to a corresponding group of storage elements arranged in a first direction in said matrix, a plurality of output channel lines each coupled to a corresponding group of storage elements arranged in a second direction in said matrix; means for transferring an information item including a plurality of digits comprising means for selectively applying signals to said input drive lines to cause each of said digits to be stored in each of the storage elements in a particular one of the groups to which one of said input drive lines is coupled, a plurality of shift drive lines each coupled to a corresponding group of said storage elements arranged in a direction other than said first and second directions, and means for energizing first and second ones of said shift drive lines in sequence after said digits have been stored in said storage devices to cause outputs representative of said digits to be developed in sequence on selected ones of said output channel lines.

17. In an information system, a multi-position register storing a multi-bit character, an input and an output for each position in said register; a matrix of ferroelectric capacitors arranged in coordinate columns and rows; each of said capacitors comprising a pair of input electrodes connected to a body of ferroelectric material; each of said capacitors in any one row of said matrix being connected to the same body of ferroelectric material; a plurality of pairs of output electrodes, there being one pair of output electrodes for each row of said matrix connected to the same body of ferroelectric material as the capacitors in that row; a plurality of input drive lines each being connected to all of the capacitors in a corresponding column of said matrix; a plurality of shift drive lines each being connected to a plurality of capacitors in said matrix and connected to only one capacitor in any one row and one capacitor in any one column in said matrix; means for interrogating said register for producing on the outputs thereof pulses indicative of the bits stored therein; each of said outputs being connected to a corresponding one of said input drive lines so that said output pulses are applied to said ferroelectric storage elements in said array; means for selectively applying a pulse to one of said shift drive lines; and means connecting said output electrodes to said inputs of said multi-position register whereby said multi-bit character originally stored in said register is re-entered therein in a form dependent upon the one of said shift lines which is energized.

18. The circuit of claim 17 wherein the pulses representative of the bits stored in said register are applied to said capacitors simultaneously with the pulse applied by said shift ilne.

19. The circuit of claim 17 wherein each of said ferroelectric capacitors is capable of being caused to assume first and second remanent information representing conditions; said pulses representative of the bits stored in the register which are applied to said input lines are effective to cause the capacitors to assume a remanent information representing condition corresponding to the value represented by the pulse applied thereto; and said pulse is applied to said shift line after said capacitors have been caused to assume said information representing conditions.

20. A matrix of ferroelectric capacitors arranged in coordinate columns and rows; a plurality of input drive lines; means for simultaneously energizing said input drive lines to simultaneously apply to said capacitors in said matrix a plurality of input pulses each representative of a binary order of an information character; each of said input drive lines being connected to all of the capacitors in a corresponding column of said matrix and each of said input pulses being applied to a corresponding one of said input lines; a plurality of output lines for said matrix each coupled to all of the capacitors in a corresponding row of the matrix; a plurality of shift drive lines for causing pulses representative of the orders of said information character to be produced on particular ones of said output lines; and means for selectively applying a shift pulse to any particular one of said shift drive lines whereby output pulses representative of the binary orders of said character are produced on said output lines with the particular one of said output lines on which each said output pulse is produced being dependent upon the one of said shift lines to which said shift pulse is applied.

21. In an information processing system a plurality of storage registers, each of said storage registers having a plurality of bit positions of different orders, the bit positions in said registers being arranged in a plurality of sets, each of said sets including a bit position of different order from each of said storage registers, means for storing the same multibit information word in each of said storage registers, an output means associated with each of said registers, a readout means for each set of bit positions for activating said output means in accordance with the information stored in the associated set of bit positions, and means for selectively activating said readout means, whereby when a particular readout means is activated the information word originally stored in each of said registers appears on said output means shifted a particular number of orders.

References Cited in the file of this patent

UNITED STATES PATENTS

| | | |
|---|---|---|
| 2,691,156 | Saltz | Oct. 5, 1954 |
| 2,736,880 | Forrester | Feb. 28, 1956 |
| 2,790,160 | Millership | Apr. 23, 1957 |
| 2,793,288 | Pulvari | May 21, 1957 |
| 2,844,812 | Auerbach | July 22, 1958 |